United States Patent
Rogasch et al.

(10) Patent No.: US 11,208,947 B2
(45) Date of Patent: Dec. 28, 2021

(54) EXHAUST GAS TURBOCHARGER

(71) Applicant: BMTS Technology GmbH & Co. KG, Stuttgart (DE)

(72) Inventors: Rene Rogasch, Fellbach (DE); Hoang-Nguyen Tran, Winnenden (DE)

(73) Assignee: BMTS TECHNOLOGY GMBH & CO. KG

( * ) Notice: Subject to any disclaimer, the term of this patent is extended or adjusted under 35 U.S.C. 154(b) by 77 days.

(21) Appl. No.: 16/711,412

(22) Filed: Dec. 11, 2019

(65) Prior Publication Data

US 2020/0191049 A1  Jun. 18, 2020

(30) Foreign Application Priority Data

Dec. 12, 2018 (DE) .................... 10 2018 221 554.5

(51) Int. Cl.
| | |
|---|---|
| *F02B 39/16* | (2006.01) |
| *F02B 37/22* | (2006.01) |
| *F04D 29/40* | (2006.01) |

(52) U.S. Cl.
CPC ............ *F02B 39/16* (2013.01); *F02B 37/22* (2013.01); *F04D 29/403* (2013.01); *F05B 2220/40* (2013.01); *F05B 2240/14* (2013.01)

(58) Field of Classification Search
CPC ........ F02B 37/22; F02B 39/16; F04D 29/403; F05B 2220/40; F05D 2240/14
USPC ................ 60/602; 251/129.04, 229; 415/148
See application file for complete search history.

(56) References Cited

U.S. PATENT DOCUMENTS

| | | | | | |
|---|---|---|---|---|---|
| 4,656,834 | A | * | 4/1987 | Elpern ................. | F02B 37/186 60/602 |
| 5,701,741 | A | * | 12/1997 | Halsall ................. | F02B 37/186 60/602 |
| 6,683,429 | B2 | * | 1/2004 | Pringle ................... | G05G 5/05 251/129.11 |

(Continued)

FOREIGN PATENT DOCUMENTS

| | | |
|---|---|---|
| DE | 10 2007 018 825 A1 | 1/2008 |
| DE | 11 2011 100 249 T5 | 11/2012 |

(Continued)

OTHER PUBLICATIONS

English abstract for DE-10 2012 023 663.
English abstract for DE-10 2013 219 690.

*Primary Examiner* — Thai Ba Trieu
(74) *Attorney, Agent, or Firm* — Fishman Stewart PLLC

(57) ABSTRACT

An exhaust gas turbocharger may include a turbine and a compressor for compression of charge air for an internal combustion engine, and a controllable actuator and a component mechanically adjustable via the actuator. The compressor may include a compressor casing through which charge air is flowable. A holding device may be integrally disposed on the compressor casing. The actuator may be coupled to the holding device, and may be secured to the compressor casing via the holding device. The holding device may have at least one integrally formed protective contour that may extend around the actuator in certain regions at a separation distance from the actuator, and may enclose the actuator in certain regions, such that the actuator is shielded in certain regions from external influences via the at least one protective contour.

19 Claims, 1 Drawing Sheet

(56) References Cited

U.S. PATENT DOCUMENTS

| | | | | |
|---|---|---|---|---|
| 6,895,751 | B1* | 5/2005 | Greentree | F02B 37/24 60/602 |
| 6,990,813 | B2* | 1/2006 | Ando | F02B 37/24 60/602 |
| 7,147,004 | B1* | 12/2006 | Hartman | F16L 37/18 251/149.6 |
| 8,474,789 | B2* | 7/2013 | Shimada | F02B 37/186 251/129.04 |
| 8,978,379 | B2* | 3/2015 | Gotoh | F02B 37/186 60/602 |
| 9,255,582 | B2 | 2/2016 | Christmann et al. | |
| 9,435,220 | B2 | 9/2016 | Alajbegovic | |
| 9,546,597 | B2 | 1/2017 | Swartz et al. | |
| 9,732,767 | B2 | 8/2017 | Cooley et al. | |
| 9,822,695 | B2* | 11/2017 | Kraemer | F02B 37/186 |
| 10,240,517 | B2 | 3/2019 | Jaegle et al. | |
| 2002/0163279 | A1* | 11/2002 | Mueller | H02K 5/143 310/239 |
| 2005/0005605 | A1* | 1/2005 | Ando | F02B 37/24 60/602 |
| 2007/0267056 | A1 | 11/2007 | Hishikawa | |
| 2010/0129205 | A1* | 5/2010 | Schwerdel | F02B 37/186 415/148 |
| 2013/0049502 | A1* | 2/2013 | Gotoh | F02B 37/186 310/80 |
| 2013/0255250 | A1* | 10/2013 | Naunheim | F02B 37/186 60/602 |
| 2013/0291539 | A1* | 11/2013 | Koch | F02B 37/186 60/602 |
| 2013/0327036 | A1* | 12/2013 | Bogner | F02B 37/186 60/600 |
| 2013/0340426 | A1* | 12/2013 | Bogner | F02B 37/186 60/602 |
| 2017/0082017 | A1* | 3/2017 | Nowak | F02B 37/186 |
| 2018/0347453 | A1 | 12/2018 | Jaenike et al. | |
| 2018/0372116 | A1* | 12/2018 | Nandagopal | F04D 29/4206 |

FOREIGN PATENT DOCUMENTS

| | | |
|---|---|---|
| DE | 10 2012 023 663 A1 | 6/2014 |
| DE | 10 2013 202 191 A1 | 8/2014 |
| DE | 10 2013 219 690 A1 | 4/2015 |
| DE | 11 2013 003 920 T5 | 5/2015 |
| DE | 10 2015 114 935 A1 | 3/2016 |
| DE | 10 2016 103 114 A1 | 8/2017 |

* cited by examiner

EXHAUST GAS TURBOCHARGER

CROSS-REFERENCE TO RELATED APPLICATIONS

This application claims priority to German Patent Application No. DE 10 2018 221 554.5, filed on Dec. 12, 2018, the contents of which are hereby incorporated by reference in their entirety.

TECHNICAL FIELD

The invention concerns an exhaust gas turbocharger with a turbine and a compressor, for the compression of charge air for an internal combustion engine.

BACKGROUND

A generic design of exhaust gas turbocharger comprises a turbine with a turbine casing, and a compressor, in which charge air for an internal combustion engine is compressed. Here the compressor comprises a compressor casing, on which a controllable actuator is fixed. The controllable actuator can be used, for example, to mechanically adapt a cross-section in the compressor casing, or in the turbine casing, through which the air can flow. Usually the actuator—and in particular an electrical actuator—is protected from heat by a heat shield, such that it is not impaired by the high heat input from the environment, or does not lose its functionality. Heat shields made of sheet metal are usually used, as is disclosed in DE 10 2012 023 663 A1 and DE 11 2013 003 920 T5, for example. Here the heat shields are produced in a complex manner from sheet metal as separate components in a plurality of production steps—for example by means of stamping, bending, or galvanising. Heat shields of this type often need additional stiffening, which further complicates the production of the heat shields. An alternative solution is a heat shield that is integrated into the compressor casing. Heat shields of this type are disclosed, for example, in U.S. Pat. No. 9,732,767 B2 and DE 10 2007 018 825 A1. Disadvantageously, such heat shields have a large, thin wall. The latter is difficult to produce in a casting process of the compressor casing, and tends to crack due to vibrations of the internal combustion engine transmitted to it and undesirable noise emission.

SUMMARY

The object of the invention is therefore to specify an improved, or at least an alternative, form of embodiment for an exhaust gas turbocharger of the generic type, in which the disadvantages described are overcome.

This object is achieved in accordance with the invention by the subject matter of the exhaust gas turbocharger described herein.

A generic design of exhaust gas turbocharger has a turbine, and a compressor, for the compression of charge air for an internal combustion engine. The exhaust gas turbocharger also has a controllable actuator, which enables a component of the exhaust gas turbocharger to be mechanically adjusted. Here the compressor has a compressor casing, through which charge air can flow. A holding device is integrally formed on the compressor casing, wherein the actuator is attached to the holding device, and thereby to the compressor casing. In accordance with the invention, the holding device has at least one protective contour formed integrally on the latter, which extends around the actuator in certain regions, and in certain regions surrounds the latter at a separation distance. The protective contour of the holding device then shields the actuator in certain regions from external influences.

Here the protective contour is an integral part of the compressor casing and can be produced with the latter in one step. By this means the number of individual parts in the exhaust gas turbocharger is reduced, as are also the production costs of the exhaust gas turbocharger. Furthermore, the production of the protective contour can be simplified. Since the protective contour is formed integrally with the holding device and thus with the compressor casing, but does not lie in the same plane as the holding device, it has an increased stiffness. The stiffness of the holding device is also increased in the same manner. The protective contour extends around the actuator in certain regions, such that material can advantageously be saved in the production of the protective contour. The protective contour can, for example, be configured in the form of a thin wall that has a thickness that is several times less in comparison to its length and width.

Advantageously the compressor casing with the integrally formed holding device can be metallic, and preferably produced in a casting process. Since the protective contour is integrally formed on the holding device, it is also metallic, and can protect the actuator from external influences. The protective contour of the holding device can advantageously be self-supporting and stiff, and, in particular, can be designed as a stiffening of the holding device, such that additional costs for stiffening of the protective contour are eliminated. The at least one protective contour can advantageously be designed as a protective heat shield, and can protect the actuator and its components from heat.

Advantageously, the at least one protective contour of the holding device can surround the actuator so as to face the turbine and/or the compressor, such that the actuator is shielded by the protective contour in certain regions from the turbine and/or the compressor, and in particular from the heat radiation from the turbine and/or the compressor. The actuator can comprise electrical and/or electronic components, and the at least one protective contour of the holding device can surround and thus protect the electrical and/or electronic components of the actuator. The actuator can comprise an adjustment shaft with a bearing and/or with a position sensor, and the at least one protective contour of the holding device can surround the adjustment shaft, the bearing, and/or the position sensor. The actuator can comprise a transmission shaft, and the at least one protective contour of the holding device can surround the transmission shaft. The protective contour can then surround the transmission shaft and/or the adjustment shaft of the actuator in certain regions, circumferentially around the longitudinal axis, and/or on the end face. In particular, heat-sensitive components and/or components with a high thermal conductivity, which can conduct heat into the interior of the actuator and thus into the vicinity of the electrical and/or electronic components, can thus be shielded from heat radiation, and in particular from the heat radiation of the turbine.

Further important features and advantages of the invention ensue from the subsidiary claims, from the figures, and from the related description with reference to the figures.

It is to be understood that the features mentioned above, and those yet to be explained below, can be used not only in the particular combination specified, but also in other combinations, or in isolation, without departing from the scope of the present invention.

Preferred examples of embodiment of the invention are shown in the figures and are explained in more detail in the following description, wherein the same reference symbols refer to the same, or similar, or functionally identical, components.

BRIEF DESCRIPTION OF THE DRAWINGS

Here, in schematic form in each case.

DETAILED DESCRIPTION

Figure 1:
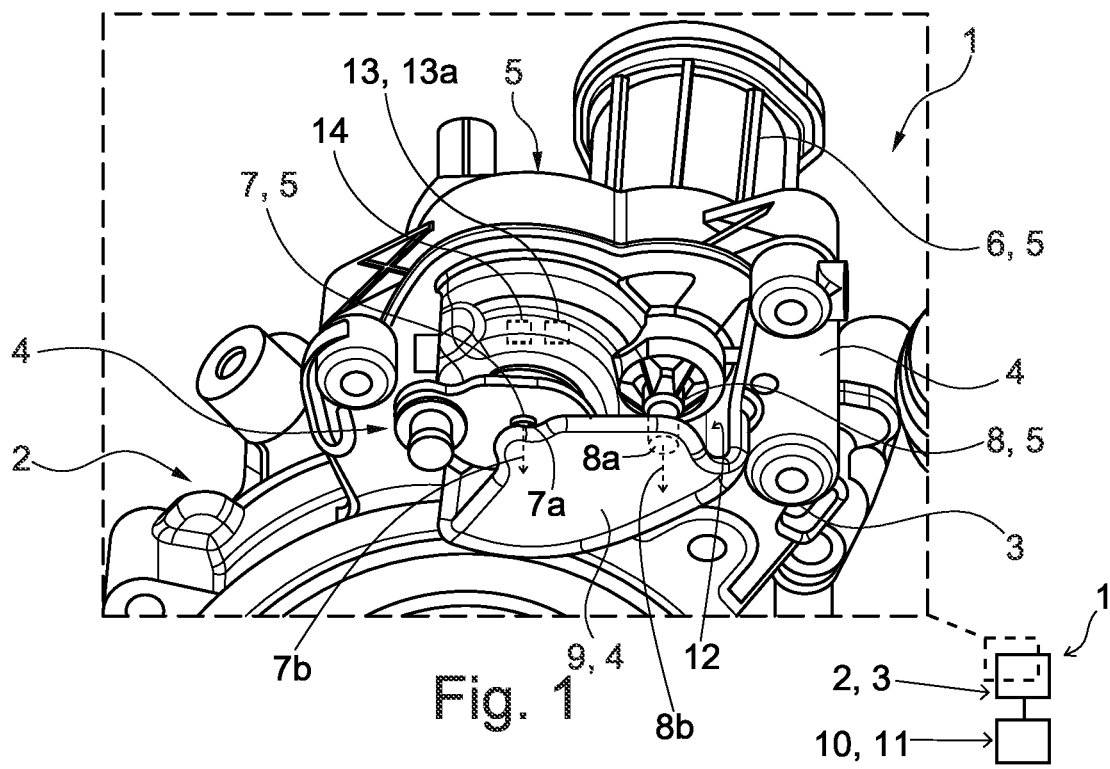
FIG. 1 shows a partial view of an inventive exhaust gas turbocharger with a holding device with a protective contour.
Figure 2:
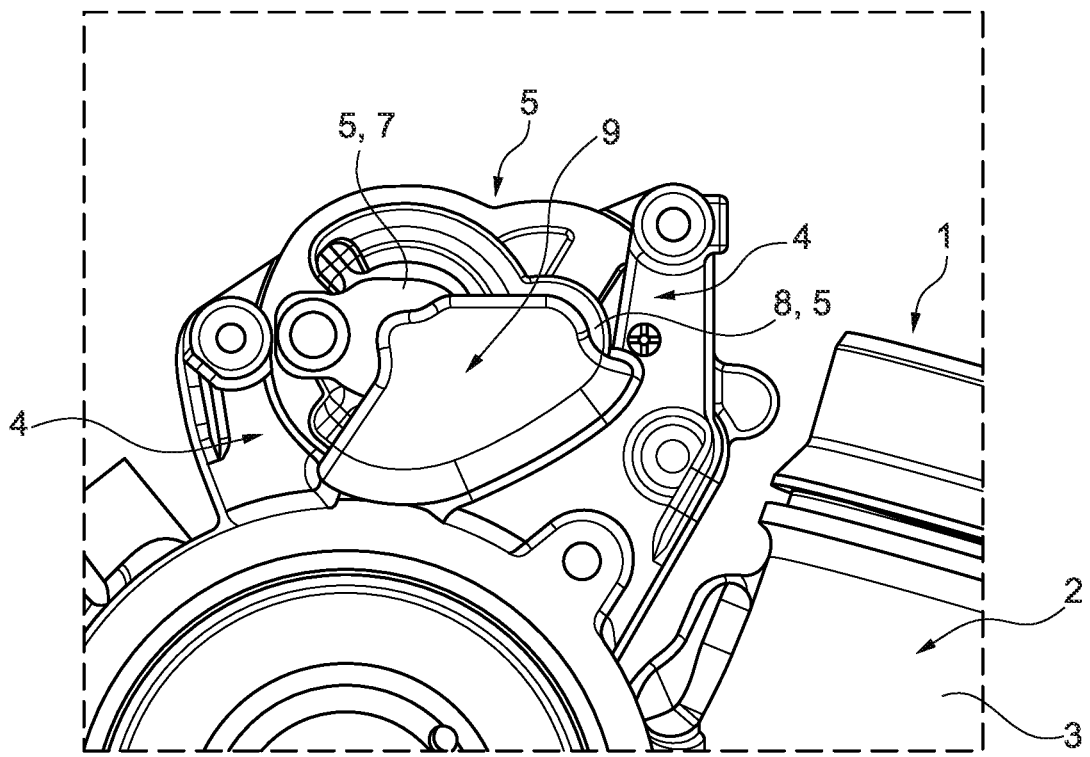
FIG. 2 shows another partial view of the exhaust gas turbocharger shown in FIG. 1.

FIG. 1 and FIG. 2 show partial views of an inventive exhaust gas turbocharger 1. The exhaust gas turbocharger 1 has a turbine 10, and a compressor 2, for an internal combustion engine. Here the compressor 2 comprises a compressor casing 3, on which a holding device 4 is integrally formed. The holding device 4 accommodates an actuator 5, and fixes the latter to the compressor casing 3. Here the actuator 5 comprises an electrical actuator 6, an adjustment shaft 7 with a position sensor 13a, and at least one transmission shaft 8. The transmission shaft 8 is mounted in a housing of the actuator 5. The actuator 5 can be controlled such that a component of the exhaust gas turbocharger 1—for example, a through-flow cross-section of the compressor 2 or the turbine 10—can be influenced. A protective contour 9 is integrally formed on the holding device 4, which surrounds the actuator 5 in certain regions. Here the protective contour 9 surrounds the adjustment shaft 7 and the transmission shaft 8, at a separation distance 12 and in certain regions, both circumferentially, and also on the end faces 7a, 8a. The compressor casing 3 is metallic, such that the holding device 4 and the protective contour 9 are metallic. In this manner, the protective contour 9 represents a protective heat shield for the actuator 5. The protective heat shield serves in particular to provide direct prevention of heat radiation from a turbine casing 11 of the turbine 10, which acts on the adjustment shaft 7, the transmission shaft 8, and the immediate surroundings of the position sensor 13a. The compressor casing 3 and the protective contour 9 of the holding device 4 can be produced in one step in a casting process. Advantageously, the actuator 5 in the inventive exhaust gas turbocharger 1 is efficiently protected from external influences, and in particular from heat, wherein the manufacturing costs and material consumption are significantly reduced compared to conventional solutions. In addition, the stiffness of the holding device 4 is advantageously increased. Furthermore, the production of the compressor casing 3 with the protective shield contour 9 is considerably simplified.

Advantageously, the at least one protective contour 9 of the holding device 4 can surround the actuator 5 so as to face the turbine 10 and/or the compressor 2, such that the actuator 5 is shielded by the protective contour 9 in certain regions from the turbine 10 and/or the compressor 2, and in particular from the heat radiation from the turbine 10 and/or the compressor 2. The actuator 5 can comprise electrical and/or electronic components 13, and the at least one protective contour 9 of the holding device 4 can surround and thus protect the electrical and/or electronic components 13 of the actuator 5. The actuator 5 can comprise an adjustment shaft 7 with a bearing 14 and/or with a position sensor 13a, and the at least one protective contour 9 of the holding device 4 can surround the adjustment shaft 7, the bearing 14, and/or the position sensor 13a. The actuator 5 can comprise a transmission shaft 8, and the at least one protective contour 9 of the holding device 4 can surround the transmission shaft 8. The protective contour 9 can then surround the transmission shaft 8 and/or the adjustment shaft 7 of the actuator 5 in certain regions, circumferentially around the longitudinal axis 8b, 7b, and/or on the end face 8a, 7a. In particular, heat-sensitive components and/or components with a high thermal conductivity, which can conduct heat into the interior of the actuator 5 and thus into the vicinity of the electrical and/or electronic components 13, can thus be shielded from heat radiation, and in particular from the heat radiation of the turbine 10.

The invention claimed is:

1. An exhaust gas turbocharger, comprising:
a turbine and a compressor for compression of charge air for an internal combustion engine;
the compressor including a compressor casing through which charge air is flowable;
a controllable actuator and a component, the component mechanically adjustable via the actuator;
a holding device integrally disposed on the compressor casing;
the actuator coupled to the holding device, and secured to the compressor casing via the holding device;
wherein the holding device has at least one integrally formed protective contour that extends at least partially around the actuator at a separation distance from the actuator, and encloses at least one region of the actuator such that the at least one region of the actuator is shielded from external influences via the at least one protective contour;
wherein the actuator includes an adjustment shaft including at least one of a bearing and a position sensor; and
wherein the at least one protective contour surrounds the adjustment shaft and the at least one of the bearing and the position sensor such that the adjustment shaft and the at least one of the bearing and the position sensor are shielded from external influences.

2. The exhaust gas turbocharger according to claim 1, wherein the at least one protective contour faces at least one of the turbine and the compressor such that the at least one region of the actuator is shielded, via the at least one protective contour, from the at least one of the turbine and the compressor.

3. The exhaust gas turbocharger according to claim 1, wherein:
the actuator includes at least one of at least one electrical component and at least one electronic component; and
the at least one protective contour surrounds the at least one of the at least one electrical component and the at least one electronic component of the actuator such that the at least one of the at least one electrical component and the at least one electronic component is shielded from external influences.

4. The exhaust gas turbocharger according to claim 1, wherein the at least one protective contour surrounds the adjustment shaft of the actuator at least one of (i) circumferentially around a longitudinal axis of the adjustment shaft and (ii) on an end face of the adjustment shaft.

5. The exhaust gas turbocharger according to claim 1, wherein:
the actuator includes a transmission shaft; and
the at least one protective contour surrounds the transmission shaft such that the transmission shaft is shielded from external influences.

6. The exhaust gas turbocharger according to claim 5, wherein the at least one protective contour at least partially surrounds the transmission shaft of the actuator at least one of (i) circumferentially around a longitudinal axis of the transmission shaft and (ii) on an end face of the transmission shaft.

7. The exhaust gas turbocharger according to claim 5, wherein a portion of the at least one protective contour at least partially circumferentially surrounds the transmission shaft and another portion of the at least one protective contour extends in a complimentary manner to an axial end face of the transmission shaft.

8. The exhaust gas turbocharger according to claim 1, wherein the compressor casing and the holding device are metallic.

9. The exhaust gas turbocharger according to claim 1, wherein the at least one protective contour is self-supporting and stiff.

10. The exhaust gas turbocharger according to claim 1, wherein the at least one protective contour is structured as a protective heat shield.

11. The exhaust gas turbocharger according to claim 1, wherein:
the compressor casing is structured as a cast metal compressor casing; and
the holding device is configured as a cast metal holding device.

12. The exhaust gas turbocharger according to claim 1, wherein the at least one protective contour is self-supporting and configured to stiffen the holding device.

13. The exhaust gas turbocharger according to claim 1, wherein a portion of the at least one protective contour at least partially circumferentially surrounds the adjustment shaft and another portion of the at least one protective contour extends in a complimentary manner to an axial end face of the adjustment shaft.

14. An exhaust gas turbocharger, comprising:
a turbine and a compressor for compression of charge air for an internal combustion engine, the compressor including a compressor casing through which charge air is flowable and a holding device integrally coupled to the compressor casing;
a controllable actuator configured to mechanically adjust at least one component;
the holding device coupled to the actuator securing the actuator to the compressor casing;
wherein the holding device has at least one integrally formed protective contour that extends around at least a portion of the actuator at a separation distance from the actuator, and encloses at least one region of the actuator such that the at least one protective contour shields the at least one region of the actuator from external influences;
wherein the actuator includes an adjustment shaft including at least one of a bearing and a position sensor; and
wherein the at least one protective contour surrounds the adjustment shaft and the at least one of the bearing and the position sensor such that the adjustment shaft and the at least one of the bearing and the position sensor are shielded from external influences.

15. The exhaust gas turbocharger according to claim 14, wherein:
the actuator includes a housing-and at least one transmission shaft;
the at least one transmission shaft is mounted within the housing; and
the at least one of the bearing and the position sensor is arranged on the adjustment shaft.

16. The exhaust gas turbocharger according to claim 15, wherein the at least one protective contour faces the turbine and shields the at least one region of the actuator from heat radiating from a turbine casing of the turbine.

17. The exhaust gas turbocharger according to claim 15, wherein:
a portion of the at least one protective contour at least partially circumferentially surrounds the adjustment shaft and the at least one transmission shaft; and
another portion of the at least one protective contour extends in a complimentary manner to an axial end face of the adjustment shaft and an axial end face of the at least one transmission shaft.

18. The exhaust gas turbocharger according to claim 14, wherein the at least one protective contour is self-supporting and configured to stiffen the holding device.

19. An exhaust gas turbocharger, comprising:
a turbine and a compressor for compression of charge air for an internal combustion engine, the turbine including a turbine casing, and the compressor including a compressor casing through which charge air is flowable and a holding device integrally coupled to the compressor casing;
a controllable actuator configured to mechanically adjust at least one of a through-flow cross-section of the compressor and a through-flow cross-section of the turbine;
the holding device coupled to the actuator securing the actuator to the compressor casing;
wherein the holding device has at least one integrally formed protective contour that extends around at least a portion of the actuator at a separation distance from the actuator, and encloses at least one region of the actuator, such that the at least one protective contour shields the at least one region of the actuator from external influences and heat radiating from the turbine casing;
wherein the actuator includes an adjustment shaft including at least one of a bearing and a position sensor; and
wherein the at least one protective contour surrounds the adjustment shaft and the at least one of the bearing and the position sensor such that the adjustment shaft and the at least one of the bearing and the position sensor are shielded from external influences.

* * * * *